(12) United States Patent
Haneda et al.

(10) Patent No.: US 7,137,658 B2
(45) Date of Patent: Nov. 21, 2006

(54) BUMPER REINFORCEMENT FOR VEHICLE

(75) Inventors: Shinichi Haneda, Anjo (JP); Kazunari Azuchi, Himi (JP); Kiyoichi Kita, Takaoka (JP)

(73) Assignees: Aisin Seiki Kabushiki Kaisha, Aichi-ken (JP); Aisin Keikinzoku Kabushiki Kaisha, Toyama-ken (JP)

( * ) Notice: Subject to any disclaimer, the term of this patent is extended or adjusted under 35 U.S.C. 154(b) by 0 days.

(21) Appl. No.: 11/088,865

(22) Filed: Mar. 25, 2005

(65) Prior Publication Data

US 2005/0212311 A1    Sep. 29, 2005

(30) Foreign Application Priority Data

Mar. 26, 2004 (JP) ............................. 2004-091832

(51) Int. Cl.
*B60R 19/48* (2006.01)
(52) U.S. Cl. .................................................. 293/117
(58) Field of Classification Search ............... 293/117, 293/102
See application file for complete search history.

(56) References Cited

U.S. PATENT DOCUMENTS

| | | | |
|---|---|---|---|
| 3,741,588 A * | 6/1973 | Dotterweich | 280/491.5 |
| 5,716,066 A * | 2/1998 | Chou et al. | 280/501 |
| 6,604,884 B1 * | 8/2003 | Ohkura | 403/187 |
| 6,659,518 B1 * | 12/2003 | Ponsonnaille et al. | 293/102 |
| 6,702,347 B1 * | 3/2004 | Hollinger et al. | 293/155 |
| 6,893,063 B1 * | 5/2005 | Harrison et al. | 293/117 |
| 6,971,694 B1 * | 12/2005 | Sakuma et al. | 293/133 |
| 2003/0052493 A1 * | 3/2003 | Ponsonnaille et al. | 293/102 |
| 2003/0075935 A1 * | 4/2003 | Dohrmann | 293/133 |
| 2004/0041416 A1 * | 3/2004 | Harrison et al. | 293/117 |
| 2005/0212311 A1 * | 9/2005 | Haneda et al. | 293/117 |

FOREIGN PATENT DOCUMENTS

| | | | |
|---|---|---|---|
| DE | 29823354 U1 * | 4/1999 | |
| DE | 19902478 C1 * | 7/2000 | |
| DE | 101 10 332 A1 | 9/2002 | |
| DE | 10110332 A1 * | 9/2002 | |
| EP | 949092 A1 * | 10/1999 | |
| EP | 1 306 236 A1 | 5/2003 | |
| EP | 1 361 082 A1 | 11/2003 | |
| JP | 2001063498 A * | 3/2001 | |
| JP | 2002053066 A * | 2/2002 | |
| WO | WO2003051654 A1 * | 6/2003 | |

OTHER PUBLICATIONS

Patent Abstracts of Japan, Publication No. JP 11334329, dated Dec. 7, 1999, Abstract.
Patent Abstracts of Japan, Publication No. JP 2002053066, dated Feb. 19, 2002, Abstract.

(Continued)

*Primary Examiner*—H Gutman
(74) *Attorney, Agent, or Firm*—Finnegan, Henderson, Farabow, Garrett & Dunner, LLP.

(57) ABSTRACT

A bumper reinforcement for a vehicle includes a front wall portion, a rear wall portion, a pair of vertically spaced connecting walls interposed between the front wall portion and the rear wall portion for establishing rigid connections therebetween, and a tow hook attachment member including a hollow body and at least one flange, the hollow body being penetrated through the front and rear wall portions, and the at least one flange being formed integrally with the hollow body to extend along an external surface of the rear wall portion, and secured to the external surface of the rear wall portion.

20 Claims, 3 Drawing Sheets

OTHER PUBLICATIONS

Patent Abstracts of Japan, Publication No. JP 2003002136, dated Jun. 21, 2001, Abstract.

Patent Abstracts of Japan, Publication No. JP 2000296742, dated Oct. 24, 2000, Abstract.

* cited by examiner

BUMPER REINFORCEMENT FOR VEHICLE

CROSS REFERENCE TO RELATED APPLICATIONS

This application is based on and claims priority under 35 U.S.C. §119 with respect to Japanese Patent Application No. 2004-091832 filed on Mar. 26, 2004, the entire content of which is incorporated herein by reference.

FIELD OF THE INVENTION

The present invention relates to a bumper reinforcement. More particularly, the present invention pertains to a bumper reinforcement to which a tow hook can be attached.

BACKGROUND

Attachment of a tow hook to a bumper reinforcement for a vehicle, in order to tow a vehicle and to bind a vehicle to a ship, is known. Japanese Patent No. 3328237 describes an example of attaching a tow hook to a bumper reinforcement.

According to the construction described in Japanese Patent No. 3328237, an attachment metal plate, which is configured to be long from side to side and has a nut portion, is bolted to a back surface of a front wall portion of a bumper reinforcement. A tow hook is screwed at the nut portion via an access hole on the front wall portion.

With the construction described in Japanese Patent No. 3328237, the tow hook is screwed onto the nut portion of the attachment metal plate via an attachment hole on the front wall portion of the bumper reinforcement in order to support a load at the front wall portion when a force in a longitudinal direction of a vehicle is applied to the tow hook. Thus, the front wall portion of the bumper reinforcement to which the attachment metal plate is bolted is configured to be thick in order to bear the load. This requirement leads to an increase in the weight of the bumper reinforcement, and is also not desirable in terms of fuel consumption.

A need thus exists for a bumper reinforcement for vehicle, which bears a load with a compact configuration.

Present invention has been made in view of the above circumstances and provides.

SUMMARY OF THE INVENTION

In light of the foregoing, the present invention provides a bumper reinforcement for a vehicle, which includes, a front wall portion, a rear wall portion, a pair of vertically spaced connecting walls interposed between the front wall portion and the rear wall portion for establishing rigid connections therebetween, and a tow hook attachment member including a hollow body and at least one flange, the hollow body being penetrated through the front and rear wall portions, and the at least one flange being formed integrally with the hollow body to extend along an external surface of the rear wall portion, and secured to the external surface of the rear wall portion.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Embodiments of the present invention will be explained with reference to illustrations of drawing figures as follows.

Figure 1:
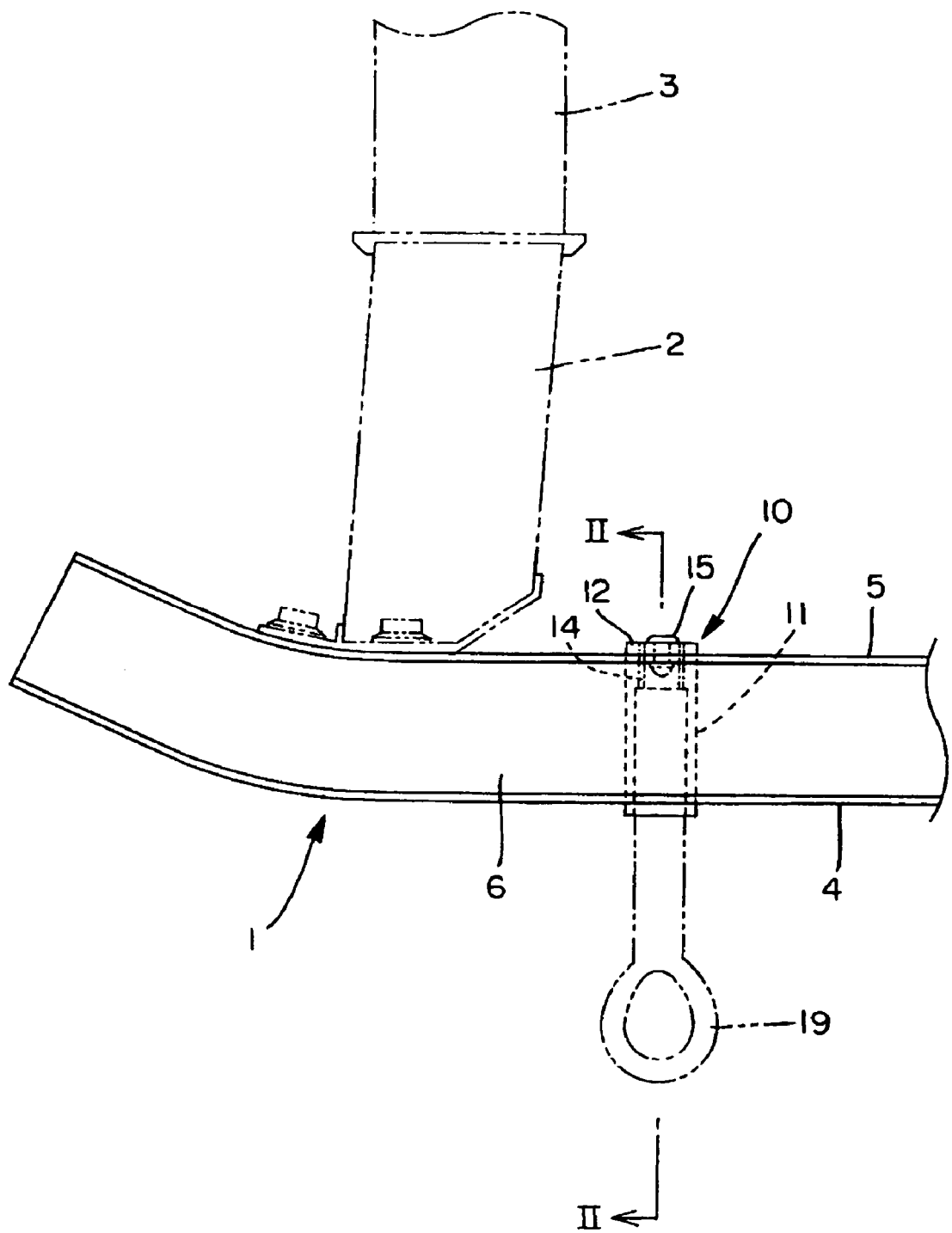
FIG. 1 is a plan view showing attachment of a bumper reinforcement according to an embodiment of the present invention.
Figure 2:
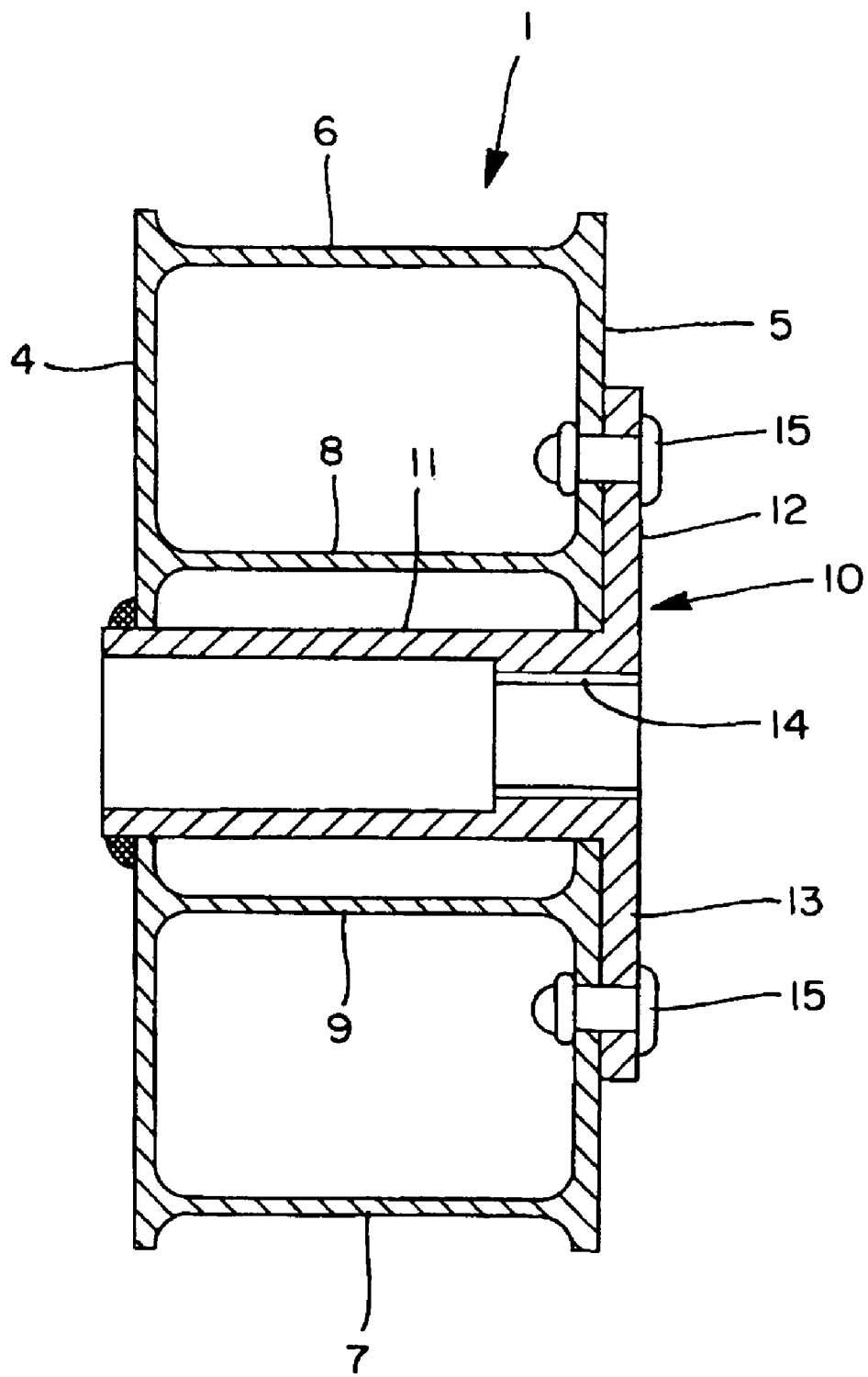
FIG. 2 is a cross-sectional view taken on line II—II of FIG. 1.

An approximately a half portion of a bumper reinforcement 1 is shown in FIG. 1. Each end portion of the bumper reinforcement 1 is fixed to a side member 3 of a vehicle body via a bumper stay 2. The bumper reinforcement 1 is formed from aluminum alloy by an extrusion process. As shown in FIG. 2, a cross section of the bumper reinforcement 1 is configured to have three compartments. The configuration of the bumper reinforcement is not limited, and the bumper reinforcement 1 may be configured to have one or two, or other numbers of compartments in cross section.

As shown in FIG. 2, the bumper reinforcement 1 includes a front wall portion 4, a rear wall portion 5, top and bottom wall portions 6, 7 (serving as connecting walls) for connecting the front wall portion 4 and the rear wall portion 5, and preferably two ribs 8, 9 which are separated from one another.

Figure 3:
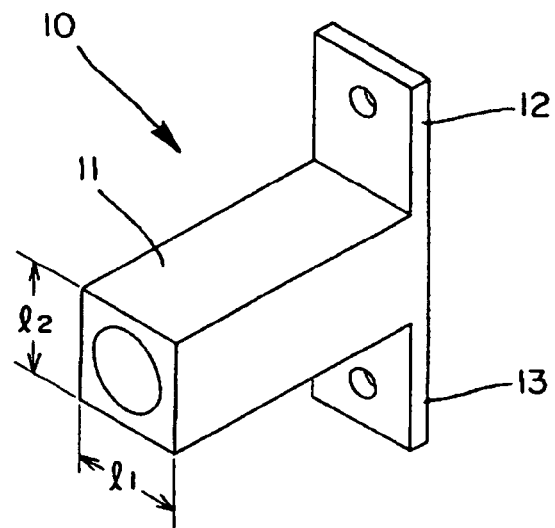
FIG. 3 is a perspective view of an attachment member according to a first embodiment of the present invention.

As shown in FIGS. 2–3, an attachment member 10 includes a body 11 configured to be of a rectangular shape with a hollow, and flanges 12, 13 unitarily formed with the body 11. An internal thread portion 14 is formed on an internal surface of the body 11 at a side close to the flanges 12, 13.

A square-shaped hole with dimensions of $l_2$ by $l_1$ (i.e., height by width) (shown in FIG. 3) is formed on the front wall portion 4, and on the rear wall portion 5, at portions between the ribs 8, 9 of the bumper reinforcement 1. The body 11 of the attachment member 10 is inserted from behind the bumper reinforcement 1 to be positioned inside the bumper reinforcement 1. The flanges 12, 13 are arranged to contact an external surface of the rear wall portion 5, and the flanges 12, 13 are fixed on the rear wall portion 5 with rivets 15, 15. A front end portion of the body 11 is welded on the front wall portion 4. Accordingly, the attachment member 10 is fixed on the bumper reinforcement 1.

Figure 4:
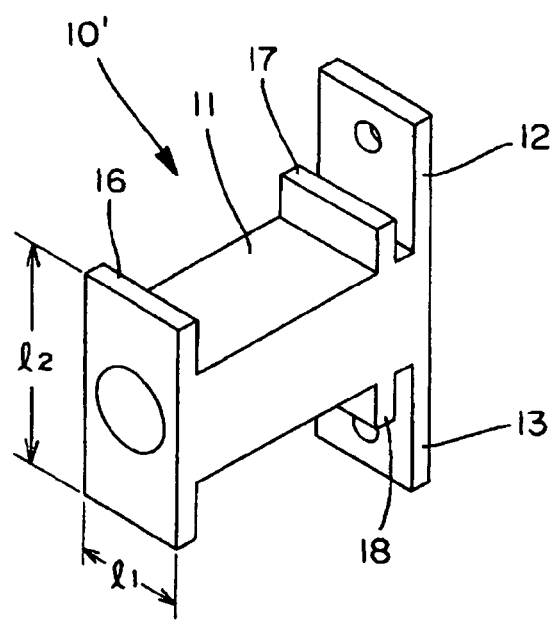
FIG. 4 is a perspective view of an attachment member according to a second embodiment of the present invention.

A second embodiment of the present invention will be explained as follows. As shown in FIG. 4, an attachment member 10' includes a backing plate portion 16 that contacts an external surface of the front wall portion 4, and nipping plates 17, 18 that are arranged to be apart from the flanges 12, 13 by a thickness of the rear wall portion 5. Otherwise, the construction of the attachment member 10' according to the second embodiment of the present invention is identical to that of the attachment member 10 of the first embodiment of the present invention. The backing plate 16 is configured to have dimensions of $l_2$ by $l_1$ as shown in FIG. 4. Also, a square hole of $l_2$ by $l_1$ is formed on the front wall portion 4 and the rear wall portion 5. Other constructions are identical to those of the first embodiment of the present invention.

When the attachment member 10' is applied, the attachment member 10' is inserted sideways into the rectangular hole of $l_2$ by $l_1$ formed on the front wall portion 4 and the rear wall portion 5. Thereafter, when the backing plate 16 comes out through the front wall portion 4, the attachment member 10' is turned so that the flanges 12, 13 are vertically arranged, the backing plate 10 is welded at an external surface of the front wall portion 4, and the flanges 12, 13 are fixed onto the rear wall portion 5 via the rivet 15. As a result, the rear wall portion 5 is sandwiched between the nipping plates 17, 18 and the flanges 12, 13. In this case, the backing plate 16 may be fixed on the front wall portion 4 via rivets.

According to the first and second embodiments of the present invention, when using a tow hook 19, the tow hook 19 is screwed with the internal thread portion 14 of the body 11 in order to apply traction in a back and forth direction of a vehicle. When the vehicle is towed forwards, because the flanges 12, 13 are arranged to be at the position of 90 degrees (i.e., right angle) so as to support the ribs 8, 9, a load is spread to the front wall portion 4, the rear wall portion 5, and the ribs 8, 9, and thus the bumper reinforcement 1 can bear a high load. The ribs 8, 9 affects for binding operation (e.g., binding a vehicle to a ship) effectively, and the bumper reinforcement 1 can bear a high load.

According to the second embodiment of the present invention, because the backing plate 16, and the nipping plates 17, 18 are configured to spread the load to the front wall portion 4, and the rear wall portion 5, a substantial force in a backward direction can be applied.

According to the embodiments of the present invention, at least one of the hollow body, the front wall portion, and the rear wall portion is made of aluminum.

According to the embodiments of the present invention, because the traction force is received at the front wall portion and the rear wall portion, it is not necessary to make the bumper reinforcement thick. Further, by receiving the traction force by the rib, the traction force can be significantly increased, and the bumper reinforcement can bear an extremely significant force even when a ship is bound. Because the attachment member can be attached by means of the rivet, the reinforcement can be manufactured with a simple method.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A bumper reinforcement for a vehicle, comprising:
    a front wall portion;
    a rear wall portion;
    a pair of vertically spaced connecting walls interposed between the front wall portion and the rear wall portion for establishing rigid connections therebetween; and
    a tow hook attachment member including a hollow body and at least one flange, the hollow body being penetrated through the front and rear wall portions, and the at least one flange being formed integrally with the hollow body to extend along an external surface of the rear wall portion, and secured to the external surface of the rear wall portion.

2. The bumper reinforcement for a vehicle according to claim 1, further comprising:
    at least one rib for connecting the rear wall portion to the front wall portion; wherein
    the rib is arranged in a position at right angles to the flange.

3. The bumper reinforcement for a vehicle according to claim 1, wherein
    the body includes a screw portion; and
    a tow hook is screwed into the screw portion.

4. The bumper reinforcement for a vehicle according to claim 3, wherein
    the screw portion is formed on an internal surface of the hollow body close to the flange.

5. The bumper reinforcement for a vehicle according to claim 1, wherein
    a nipping plate portion is also formed on the hollow body; and
    the rear wall portion is arranged so to be sandwiched between the flange and the nipping plate portion.

6. The bumper reinforcement for a vehicle according to claim 1, wherein the flange is fixed on the rear wall portion by means of at least one rivet.

7. The bumper reinforcement for a vehicle according to claim 1, wherein at least one of the hollow body, the front wall portion, and the rear wall portion is made of aluminum.

8. The bumper reinforcement for a vehicle according to claim 3, wherein the hollow body extends outwardly from the front wall portion.

9. The bumper reinforcement for a vehicle according to claim 8, wherein the hollow body is fixed to the front wall portion.

10. The bumper reinforcement for a vehicle according to claim 9, wherein the connection between the hollow body and the front wall portion is established by welding.

11. A bumper reinforcement for a vehicle, comprising:
    a front wall portion;
    a rear wall portion;
    a pair of vertically spaced connecting walls interposed between the front wall portion and the rear wall portion for establishing rigid connections therebetween; and
    a tow hook attachment member including a hollow body and a pair of upwardly and downwardly extending flanges, the hollow body being penetrated through the front and rear wall portions, and the flanges being formed integrally with the hollow body to extend along an external surface of the rear wall portion, and secured to the external surface of the rear wall portion.

12. The bumper reinforcement for a vehicle according to claim 11, further comprising:
    a pair of vertically spaced ribs interposed between the front wall portion and the rear wall portion for establishing rigid connections therebetween, the ribs being arranged to be perpendicular to the flanges.

13. The bumper reinforcement for a vehicle according to claim 11, wherein
    the body includes a screw portion into which a tow hook is screwed.

14. The bumper reinforcement for a vehicle according to claim 13, wherein
    the screw portion is formed on an internal surface of the hollow body close to the flanges.

15. The bumper reinforcement for a vehicle according to claim 11, wherein
    a pair of upwardly extending and downwardly nipping plate portions are formed on the hollow body, the rear wall portion being sandwiched between each of the nipping plate portions and its corresponding flange.

16. The bumper reinforcement for a vehicle according to claim 11, wherein each of the flanges is fixed on the rear wall portion by means of a rivet.

17. The bumper reinforcement for a vehicle according to claim 11, wherein at least one of the hollow body, the front wall portion, and the rear wall portion is made of aluminum.

18. The bumper reinforcement for a vehicle according to claim 13, wherein the hollow body extends outwardly from the front wall portion.

19. The bumper reinforcement for a vehicle according to claim 18, wherein the hollow body is fixed to the front wall portion.

20. The bumper reinforcement for a vehicle according to claim 19, wherein the connection between the hollow body and the front wall portion is established by welding.

* * * * *